United States Patent
Halfmann et al.

(10) Patent No.: US 8,611,914 B2
(45) Date of Patent: Dec. 17, 2013

(54) INTER BASE STATION COMMUNICATION FOR JOINT RESOURCE MANAGEMENT

(75) Inventors: Ruediger Halfmann, Otterberg (DE); Andreas Lobinger, Miesbach (DE); Jijun Luo, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 409 days.

(21) Appl. No.: 12/310,352

(22) PCT Filed: Aug. 17, 2007

(86) PCT No.: PCT/EP2007/058570
§ 371 (c)(1),
(2), (4) Date: Oct. 8, 2009

(87) PCT Pub. No.: WO2008/022969
PCT Pub. Date: Feb. 28, 2008

(65) Prior Publication Data
US 2010/0041426 A1    Feb. 18, 2010

(30) Foreign Application Priority Data
Aug. 23, 2006    (EP) ................... 06017575

(51) Int. Cl.
*H04W 72/00*    (2009.01)
*H04W 40/00*    (2009.01)
*H04W 4/00*    (2009.01)

(52) U.S. Cl.
USPC ................. 455/452.1; 455/447; 370/329

(58) Field of Classification Search
USPC ........... 455/450, 464, 509, 436, 63.1, 452.1, 455/452.2, 453, 524, 525, 447, 446, 432.1, 455/437, 422.1, 69, 449, 70; 370/330, 208, 370/329, 344, 470, 328, 336, 415, 254, 338, 370/312, 345, 458
See application file for complete search history.

(56) References Cited

U.S. PATENT DOCUMENTS 6,459,901 B1    10/2002    Chawla et al.
7,664,467 B2 *    2/2010    Cheng et al. .............. 455/70
(Continued)

FOREIGN PATENT DOCUMENTS

CN    1202690 A    12/1998
DE    199 03 017    7/2000
(Continued)

OTHER PUBLICATIONS

O. Lazaro, D. Girma, "Dynamic channel allocation based on a Hopfield neural network and requirements for autonomous operation in a distributed environment", XP010353010, IEEE, Sep. 19, 1999, NL, pp. 2334-2338.
(Continued)

*Primary Examiner* — Andrew Wendell
*Assistant Examiner* — Cindy Trandai
(74) *Attorney, Agent, or Firm* — Staas & Halsey LLP

(57) ABSTRACT

According to a method for operating a radio communication system, a first radio station decides about the assignment of first radio resources to a user terminal and thereafter assigns the first radio resources to the user terminal. Before deciding about the assignment of the first radio resources to the user terminal, the first radio station transmits information to a second radio station regarding the first radio station's future assignment of the first radio resources. Radio stations carry out the method.

19 Claims, 2 Drawing Sheets

(56) References Cited

U.S. PATENT DOCUMENTS

| | | | |
|---|---|---|---|
| 2002/0082021 A1* | 6/2002 | Chen et al. | 455/450 |
| 2003/0176187 A1* | 9/2003 | Menzel et al. | 455/432.1 |
| 2006/0250938 A1* | 11/2006 | Khan et al. | 370/208 |
| 2009/0124261 A1* | 5/2009 | Shimomura | 455/436 |
| 2010/0142471 A1* | 6/2010 | Cheng et al. | 370/329 |
| 2010/0172316 A1* | 7/2010 | Hwang et al. | 370/330 |

FOREIGN PATENT DOCUMENTS

| | | |
|---|---|---|
| EP | 1 024 611 | 8/2000 |
| EP | 1 217 852 | 6/2002 |

OTHER PUBLICATIONS

Chinese Office Action issued May 25, 2011 in corresponding Chinese Patent Application 200780039350.

Lazaro et al., "Dynamic Channel Allocations based on a Hopfield Neural Network and Requirements for Autonomous Operation in a Distributed Environment" IEEE, Sep. 19, 1999; pp. 2334-2338.

Siemens: "Revised Text Proposal for TR R3.018 on RRM in LTE" 3GPP TSG RAN WG3 Meeting #52, May 8-15, 2006; pp. 1-3.

Ericsson: "Options for Inter-cell Interference Coordination (ICIC)" 3GPP TSG RAN WG3 Meeting #53, Aug. 28-Sep. 1, 2006; pp. 1-4.

\* cited by examiner

FIG 2

|       | T1  | T2  | T3  |
|-------|-----|-----|-----|
| SB S1 | 90% |     |     |
| SB S2 |     | 10% |     |
| SB S3 |     |     | 50% |
| SB S4 |     |     | 40% |

FIG 3

| SB S1 | FS |
|-------|----|
| SB S2 | SS |
| SB S3 | FS |
| SB S4 | FS |

INTER BASE STATION COMMUNICATION FOR JOINT RESOURCE MANAGEMENT

CROSS REFERENCE TO RELATED APPLICATIONS

This application is based on and hereby claims priority to PCT Application No. PCT/EP2007/058570 filed on Aug. 17, 2007 and European Application No. EP06017575 filed on Aug. 23, 2006, the contents of which are hereby incorporated by reference.

BACKGROUND OF THE INVENTION

The present invention relates to a method for operating a radio communication system, wherein a radio station decides about the assignment of radio resources to a user terminal.

In radio communication systems, messages containing information such as speech, video data, SMS (Short Message Service), MMS (Multimedia Messaging Service), remote control, etc. are transmitted over an air interface between radio stations. The transmission can be both bidirectional and unidirectional. Radio stations receiving and/or transmitting messages can be part of the network infrastructure, being e.g. base stations, repeaters, access points; on the other hand, radio stations being user terminals exist. In a mobile radio communication system, at least some user terminals are mobile radio stations. For transmitting messages, carrier frequencies available to the respective radio communication system are used.

Current mobile radio communication systems are oftentimes cellular systems designed e.g. according to the standard GSM (Global System for Mobile Communication) or UMTS (Universal Mobile Telecommunications System), having network infrastructure components comprising amongst others base stations and devices for controlling the base stations. A further example of a radio communication system is a broadband system with wireless access, e.g. according to IEEE 802.16. Future systems may be evolutions of UMTS, referred to as LTE (Long Term Evolution), fourth generation systems, or ad-hoc networks. Besides the wide-ranging cellular systems, wireless local networks like WLANs, HiperLAN systems, DECT systems, IEEE 802.11 systems, Bluetooth systems, and WATM systems can be deployed.

Different multiple access techniques exist in order to allow user terminals to access the radio resources. Multiple access techniques allow for a partitioning of radio resources in the time domain (Time Division Multiple Access, TDMA), in the frequency domain (Frequency Division Multiple Access, FDMA), in the code domain (Code Division Multiple Access, CDMA), and in the space domain (Space Division Multiple Access, SDMA). Preferably combinations of different multiple access techniques are applied, such as the combination of a FDMA and a CDMA technique.

In order to make an especially efficient transmission of information possible, a frequency band can be subdivided into a multiplicity of subbands. This method permits to transmit several narrowband signals instead of one broadband signal, having the advantage of reducing the complexity on the receiver end. Furthermore, by using subbands radio resources can be assigned to user terminals with high granularity. The latter is especially beneficial for transmissions with varying data rates. OFDM (Orthogonal Frequency Division Multiplexing), an example of a multicarrier transmission method, uses approximately rectangular pulse shapes in the time domain. Looking at a certain subband, as a result of the choice of the width of OFDM-subbands, the signals of the other subbands have a zero crossing in the middle of the certain subband, so that the OFDM-subbands are orthogonal to each other. In case narrow subbands are used, the signal transmission of the single subbands is normally not frequency selective.

In case a first radio station communicates using first radio resources, and a second radio station communicates using the same or similar radio resources, interference between the two communications is generated. In order to avoid this interference, radio resource management can be applied.

SUMMARY

One potential object is to provide a method for operating a radio communication system which allows for an efficient radio resource management. It is a further potential object to provide respective radio stations.

The inventors propose a method for operating a radio communication system, in which a first radio station decides about the assignment of first radio resources to a user terminal and thereafter assigns the first radio resources to the user terminal. Before deciding about the assignment of the first radio resources to the user terminal, the first radio station transmits information to a second radio station regarding the first radio station's future assignment of the first radio resources.

The radio communication system comprises at least two radio stations, namely the first and the second radio station. Advantageously a radio station is part of the network infrastructure and therefore is not a user terminal; in this case a radio station can e.g. be a base station of a cellular mobile radio communication system, a repeater of a multihop system, or an access point of a local system.

The first radio station decides about the assignment of radio resources to the user terminal. This decision results in a one-to-one mapping between the user terminal and the first radio resources. By assigning the first radio resources to the user terminal and by through this scheduling the user terminal, the first radio station informs the user terminal about the fact that the first radio resources are allocated to it. After having assigned the first radio resources to the user terminal, the first radio station and the user terminal or the user terminal and an other user terminal or radio station communicate using the first radio resources. A communication between the first radio station and the user terminal using the first radio resources can be an uplink communication, i.e. the transmission of messages from the user terminal to the first radio station, and/or a downlink communication, i.e. the transmission of messages from the radio station to the user terminal. The type of the first radio resources depends on the radio communication system the method is applied to; possible is e.g. a combination of frequency and/or code and/or time and/or spatial resources.

Instead of deciding about the assignment by the first radio station itself, the decision can be made by another entity, the other entity informing the first radio station about the decision.

The first radio station informs the second radio station about a future assignment of the first radio resources by the first radio station. In case this would be effected after the first radio station decided that the first radio resources are to be assigned to the user terminal, the information could indicate that the first radio resources will be or are assigned to the user terminal, this message either mentioning the first radio resources in combination with the user terminal or mentioning only the first radio resources as being assigned by the first radio station.

However according to the inventors' proposal, the information is sent to the second radio station before the first radio station making the decision to assign the first radio resources to the user terminal. Therefore, as it is not clear yet to which user terminal the first radio resources will be assigned to by the first radio station or if the first radio resources will be assigned by the first radio station at all, the information cannot contain the fact of the certain future one-to-one mapping between the user terminal and the first radio resources. Preferably, the information does not relate to specific user terminals at all. Rather, it can contain statements concerning the strategy of radio resource assignment applied by the first radio station or the first radio station's predictions about the use of the first radio resources.

According to an advantageous embodiment, the second radio station uses the information when deciding about the assignment of radio resources to user terminals. By the second radio station making use of the information transmitted by the first radio station, scheduling decisions of different radio stations can be at least partially coordinated.

The inventors also propose a method for operating a radio communication system, a second radio station decides about the assignment of radio resources to user terminals and thereafter assigns the radio resources to the user terminal. The second radio station receives information from a first radio station regarding the first radio station's future assignment of first radio resources, the information being transmitted by the first radio station before deciding about the assignment of the first radio resources, and the second radio station uses the information when deciding about the assignment of radio resources to user terminals.

While the first method corresponds to the point of view of the radio station transmitting the information, the second method corresponds to the point of view of the radio station receiving the information. The explanations and comments concerning the first method therefore apply mutatis mutandis to the second method.

According to an advantageous embodiment the first radio resources are shared between the first radio station and the second radio station. In this case, either of the two radio stations has in principle the right to use and assign the first radio resources. This implies that there are no strict rules entitling only the first or the second radio station the use of the first radio resources. Rather, collisions in the sense of the first and the second radio station both assigning simultaneously the shared radio resources can occur.

Preferably, the first radio station and the second radio station are neighbouring radio stations directly communicating with each other. The radio cells, i.e. the area in which a user terminal or radio station has to be located in order to communicate with the respective radio station, of neighbouring radio stations overlap or are adjacent to each other. As the communication between the first and the second radio station is a direct communication, it is affected without the need of a node relaying messages.

The first radio station can be entitled to transmit the information to the second radio station due to a communication between the first and the second radio station regarding the entitlement, or due to an instruction of a network infrastructure device, e.g. of an O&M (operation and maintenance) entity. The entitlement can be advantageous for the first radio station if the second radio station having received the information has to react to the information in a certain way. Preferred reactions of the second radio station will be described later on.

In another embodiment the first radio station receives from the second radio station information regarding the second radio station's future assignment of radio resources. The information transmitted by the second radio station can be of the same type as the information transmitted by the first radio station. In case the first radio station's information refers e.g. to its predictions of its use of the first radio resources, the second radio station's information can accordingly refer to its predictions of its use of the first radio resources.

According to a preferred embodiment the information indicates a probability of assignment of the first radio resources by the first radio station. Here, the probability is estimated from the point of view of the first radio station. The probability does not refer to the probability of assignment to a particular user terminal, but rather to the first radio station assigning the first radio resources to any user terminal. Preferably, the probability is in the range of >0% and <100%, corresponding to the fact that the first radio station has not yet decided about its assignment of the first radio resources. Alternatively, values of 0% and 100% can be allowable.

The information can indicate directly and explicitly a probability value, e.g. 40% probability of the first radio station assigning the first radio resources or of the first radio station not assigning the first radio resources, or implicitly, so that a probability from the first radio station's point of view can be determined by the second radio station by using the information. Indicating several radio resources and sorting these radio resources in the information transmitted from the first radio station according to their respective probabilities is an example of an implicit indication of a probability. In this case, the information does not have to contain a probability value. Supposed the information indicates the first radio resources and some other radio resources whereas the order of radio resources has the first radio resources in the first and the other radio resources in the second position. This corresponds to the information notifying that the probability of the first radio station assigning the first radio resources is higher than the first radio station assigning the other radio resources.

A further example of indicating a probability is the usage of a conditional probability, i.e. the probability of the first radio station assigning the first radio resources subject to a condition, e.g. the probability of the first radio station assigning the first radio resources subject to the condition that the first radio resources are currently assigned by the first radio station. In this case, the second radio station can perform measurements to determine whether the first radio resources are currently assigned by the first radio station in order to calculate the probability of future assignment of the first radio resources by the first radio station. Using conditional probabilities allows for the reduction of data to be transferred between the radio stations.

The information can indicate a plurality of probabilities pertaining to a plurality of radio resources. This means that the information refers to more than one radio resource, indicating a probability for each of the more than one radio resource.

The second radio station can use the information when deciding about the assignment of radio resources to user terminals such that user terminals are grouped according to the probabilities pertaining to radio resources assigned to user terminals of the respective group. This is advantageously performed by grouping user terminals according to some property, e.g. advantageously according to the quality of service required by them or a priority given to them, and by allocating users within a group to radio resources having the same or similar probabilities.

Preferably, the second radio station uses the information when deciding about the assignment of radio resources to user terminals such that the higher the probability of assignment of radio resources by the first radio station, the less likely the assignment of these radio resources by the second radio station. In case the information indicates e.g. that the first radio station is going to assign the first radio resources almost certainly, the second radio station should not assign the first radio resources. By including the probabilities in scheduling decisions, interference can be avoided or at least reduced.

According to an other embodiment the information relates to a duration of assignment of the first radio resources by the first radio station. The indication of the duration can be applied in addition or in place of the indication of the probability. The type of relation between the information and the duration can be diverse. As an example of a direct relation the information can specify a time span during which the first radio resources will be assigned by the first radio station in case of assignment of the first radio resources by the first radio station.

Advantageously the second radio station uses the information such that the second radio station during a time span dependent on the duration refrains from trying to detect whether the first radio resources are assigned by the first radio station. Furthermore, the second radio station can use the information such that after detecting that the first radio resources are assigned by the first radio station, the second radio station determines dependent on the duration a probability of future assignment of the first radio resources by the first radio station. These two embodiments each allow for the reduction of measurement effort on the side of the second radio station or of user terminals reporting measurement results to the second radio station.

According to an advantageous embodiment, the information relates to one out of two selectable durations. The two selectable durations can be concrete numbers for two lengths of time, e.g. 1 time slot and 10 time slots, or relative indications such as "short" and "long".

Preferably, the information relates to the longer out of the two selectable durations, and the second radio station uses the information when deciding about the assignment of radio resources to user terminals such that the second radio station refrains from assigning the first radio resources when detecting that the first radio resources are assigned by the first radio station. In this case the longer out of the two durations means for the second radio station that the first radio station has a privilege with regard to the first radio resources once the first radio station assigns the first radio resources.

Advantageously the first radio resources are radio resources of a first subband, the first radio station uses the one out of the two selectable durations when assigning radio resources of the first subband, and the second radio station uses the information when deciding about the assignment of radio resources to user terminals such that the second radio station uses the other out of the two selectable durations when deciding about the assignment of radio resources of the first subband. In this case the first radio station has a privilege with regard to radio resources of the first subband insofar as the second radio station is not allowed to use the same duration once the first radio station indicated its application of this duration.

Advantageously, the first radio station uses the other out of the two selectable durations when assigning radio resources of a second subband, and the second radio station uses the one out of the two selectable durations when assigning radio resources of the second subband. This kind of division regarding the application of different durations is advantageously applied to any subband shared between the first and the second radio station.

The inventors propose a first radio station for communicating with user terminals, the radio station having a processor for deciding about the assignment of first radio resources to a user terminal, for assigning the first radio resources to the user terminal, and a transmission portion for transmitting information to a second radio station regarding the radio station's future assignment of the first radio resources, the transmission being performed before deciding about the assignment of the first radio resources to the user terminal.

The second radio station proposed by the inventors for communicates with user terminals, and has a processor for deciding about the assignment of radio resources to a user terminal, an assignment unit for assigning radio resources to the user terminal, a receiver for receiving information from an other radio station regarding the other radio station's future assignment of first radio resources, the information being transmitted by the other radio station before deciding about the assignment of the first radio resources to the user terminal, and a connection for using the information when deciding about the assignment of radio resources to user terminals.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 depicts a probability map,

FIG. 3 depicts a scheduling time scale map.

DETAILED DESCRIPTION OF THE PREFERRED EMBODIMENT

Figure 1:
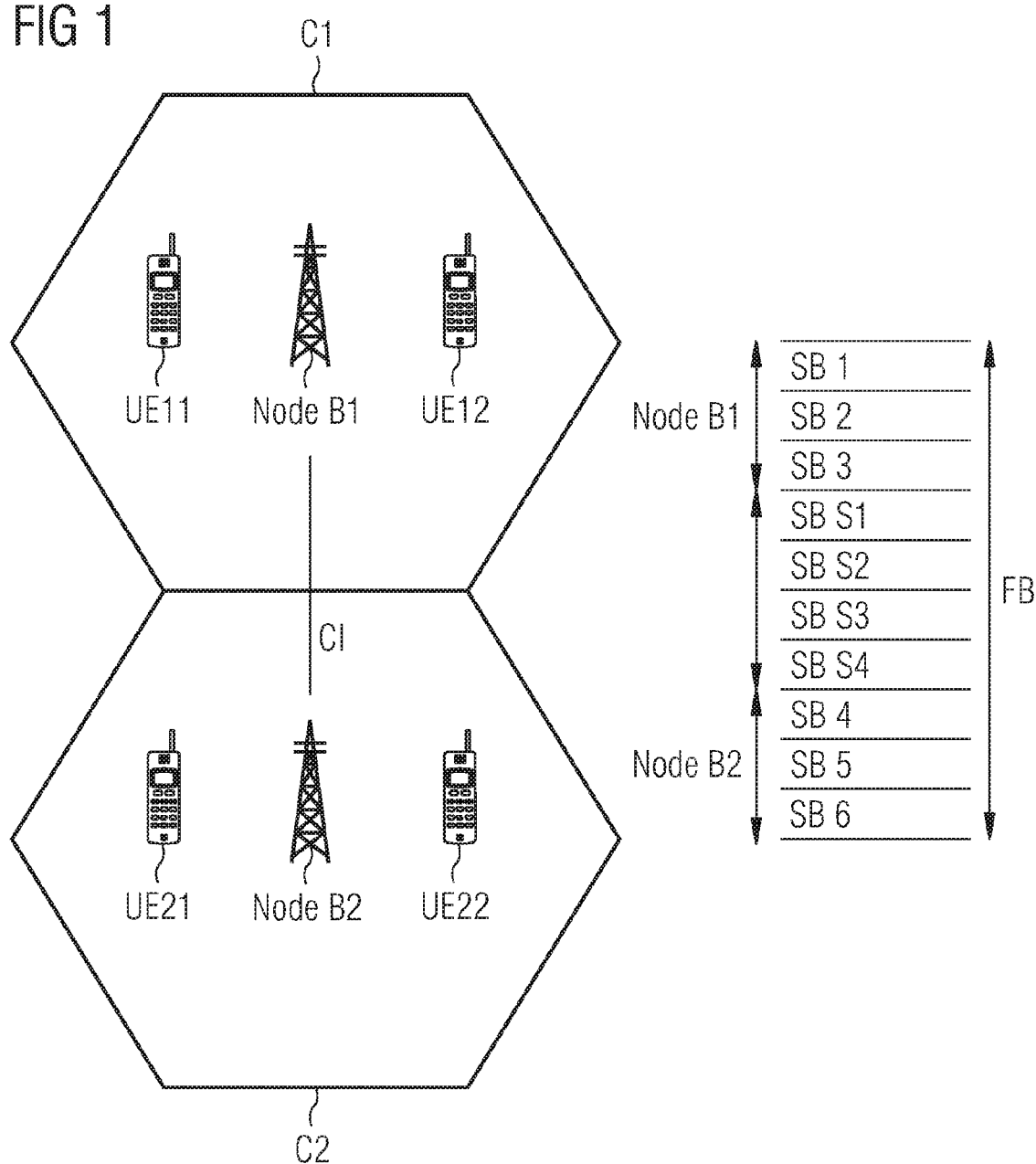
FIG. 1 depicts radio cells of a radio communications system.

Reference will now be made in detail to the preferred embodiments of the present invention, examples of which are illustrated in the accompanying drawings, wherein like reference numerals refer to like elements throughout.

FIG. 1 shows the radio cell CI of base station NodeB 1 as well as the radio cell C2 of base station NodeB 2. Base stations NodeB 1 and NodeB 2 are connected to a wired or wireless backhaul service, the backhaul service for simplification reasons not being depicted. It is possible that the radio communication system comprises radio cells beside the radio cells CI and C2 of FIG. 1. The method can be used in different kinds of radio communication systems having more than one network infrastructure radio station, e.g. in systems according to a 3G LTE ($3^{rd}$ Generation Long Term Evolution) standard, or in a multihop radio communications system. In the latter case, base station NodeB 1 and/or base station NodeB 2 can be relay stations of the network infrastructure.

Located inside radio cell CI are user terminals UEII and UE12, and user terminals UE21 and UE22 are situated inside radio cell C2. A user terminal is for instance a mobile radio terminal, particularly a mobile phone, a computer or a flexible fixed device, for transmitting and/or receiving messages containing audio information such as speech or music, and/or text information and/or picture information and/or video information. The user terminals UEII and UE12 communicate with base station NodeB 1 using a wireless link; via base station NodeB 1, user terminals UEII and UE12 within the radio cell CI can communicate with each other, with radio stations of other radio cells, or with other communication systems such as the internet. The same applies to the communication of user terminals UE21 and UE22 inside the radio cell C2 via base station NodeB 2.

For communications between base stations NodeB 1 and NodeB 2 and user terminals UEII, UE12, UE21 and UE22, a frequency band FB is utilized, the frequency band FB being subdivided into subbands SB 1, SB 2, SB 3, SB SI, SB S2, SB S3, SB S4, SB 4, SB 5 and SB 6 of equal width. For transmitting signals using these subbands, it is advantageous to apply OFDM. Some subbands, namely the subbands SB 1, SB 2 and SB 3, are exclusively at the base station NodeB 1's disposal. Similarly, there are subbands which are exclusively at the base station NodeB 2's disposal, namely the subbands SB 4, SB 5 and SB 6. The remaining subbands, namely the subbands SB SI, SB S2, SB S3 and SB S4 on the other hand are shared subbands, meaning that both base stations NodeB 1 and NodeB 2 have the right to use these subbands. Hence, while subbands SB 1, SB 2 and SB 3 are used only by base station NodeB 1 for transmitting and/or receiving signals and subbands SB 4, SB 5 and SB 6 are used only by base station NodeB 2 for transmitting and/or receiving signals, the subbands SB SI, SB S2, SB S3 and SB S4 can be used by both base stations NodeB 1 and NodeB 2 for transmitting and/or receiving signals. For instance subband SB SI can be used by base station NodeB 1 during a first time span, by base station NodeB 2 during a second time span, and by base stations NodeB 1 and NodeB 2 during a third time span.

The embodiment described referring to FIG. 1 is limited to only two neighbouring base stations. As a matter of course the method and radio stations are applicable to a greater number of adjacent radio cells. In this case, the allocation of subbands to radio cells can be different from the allocation of FIG. 1: the frequency band FB can e.g. constitute only a section of a broader frequency band used by the greater plurality of radio cells, or the subbands SB SI, SB S2, SB S3 and SB S4 can be shared between more than two base stations.

The interface CI connecting base stations NodeB 1 and NodeB 2 is used to transmit signalling messages between base stations NodeB 1 and NodeB 2. The transmission of messages over the interface CI can take place e.g. via cable or radio. Transmissions between base stations NodeB 1 and NodeB 2 are effected directly, i.e. without any node relaying the messages.

In case base station NodeB 1 presently communicates using one of the shared subbands, e.g. subband SB SI, and at the same time base station NodeB 2 communicates using the same subband SB SI, intercell interference is generated. In order to avoid this undesirable effect of intercell interference which leads to performance degradations, scheduling in both cells CI and C2 should cooperate. The task of scheduling in each cell CI and C2 is to allocate radio resources to certain transmissions, e.g. to allocate circuit switched dedicated radio resources to a user terminal for transmitting and receiving signals, or to allocate packet switched radio resources to a user terminal for receiving data packets of an internet download. In the radio communication system of the considered embodiment, scheduling in each cell is performed by the respective base station. With respect to the shared subbands SB SI, SB S2, SB S3 and SB S4 this implies that each base station NodeB 1 and NodeB 2 has to decide whether to currently use shared radio resources.

Base stations NodeB 1 and NodeB 2 exchange information regarding their respective future use of the shared radio resources. When receiving such information, the receiving base station NodeB 1 or NodeB 2 takes this information into account when performing scheduling. This allows for a joint resource management and helps to reduce intercell interference.

In the following, as first example of information regarding the future use of shared radio resources exchanged between base stations NodeB 1 and NodeB 2, the probability map of FIG. 2 will be described. The rows of the map correspond to the shared subbands SB SI, SB S2, SB S3 and SB S4, while the columns correspond to future periods of time T1, T2 and T3. A period of time can for instance be a time slot or the duration of an OFDM symbol. An entry of x % relating to certain future radio resources indicates that the base station transmitting the map considers that it is going to use these radio resources with the probability of x %. Making use of radio resources in this connexion can be realized by downlink transmissions, i.e. transmissions from a base station to a user terminal, or by uplink transmissions, i.e. transmissions from a user terminal to a base station. Clearly, instead of indicating the probability of using radio resources, the probability of not using radio resources can be entered in the map.

Supposed the table of FIG. 2 is transmitted from base station NodeB 1 to base station NodeB 2. Herefrom base station NodeB 2 knows that base station NodeB 1 is going to communicate using subband SB SI during period of time T1 with a probability of 90%, subband SB S2 during period of time T2 with a probability of 10%, subband SB S3 during period of time T3 with a probability of 50%, and subband SB S4 during period of time T3 with a probability of 40%. The entries of the map with the exception of indications "0%" or "100%" do not constitute hard values, rather they are soft values, because base station NodeB 2 receiving these values cannot know for sure whether certain radio resources will be occupied by base station NodeB 1 or not.

The base station NodeB 2 receiving the probability map uses the information contained in the map as one criterion for deciding about which radio resources to schedule. If e.g. user terminal UE22 measures and reports the same quality level regarding subbands SB SI and SB S2, base station NodeB 2 should during period of time T1 not allocate subband SB SI to user terminal UE22 as subband SB SI will be used almost certainly at the same time by base station NodeB 1, but rather allocate subband SB S2 for user terminal UE22. As a matter of course, in scheduling decisions the soft values can be implemented in different ways. Generally speaking, a high probability value received from the neighbouring base station regarding the assignment of radio resources hints towards not assigning these radio resources while a low probability value hints toward assigning.

The usage of radio resources having void entries in a map e.g. subband SB S2 in combination with period of time T1 in FIG. 2 by the base station receiving the map can follow different strategies. These radio resources can, depending for instance on the kind of service the radio resources are to be assigned for, be treated like radio resources having a high, average or low probability value. Alternatively, it is possible not to allow for the transmission of maps having void entries. This can be caused by the reasoning that the base station transmitting a map as a matter of principle has more knowledge about its future use of radio resources than the neighbouring base station can have, therefore even uncertain probability values being more helpful for the neighbouring base station than having no value at all.

An advantage of a base station taking into consideration the soft values received from another base station is the reduction of variance of interference experienced. Through this increased certainty regarding intercell interference, it is easier to guarantee a certain quality of service level. For this purpose, a base station can for instance arrange its user terminals in groups, a group comprising users of a certain priority being assigned subbands having similar probability values of the adjacent base station, such as a group having a high priority being assigned only subbands having a low probability value of the adjacent base station assigning them. Besides assigning radio resources with similar soft values, the user terminals of a group can be treated uniformly regarding other issues, such as the frequentness of performing measurements with regard to the assigned radio resources.

The base station transmitting the map has in advance to generate the probability values. This can be achieved using statistical evaluations of past measurements and allocations, such as:

In case during a certain period of time a first subband was more or less continuously used by the base station, while a second subband was hardly assigned, the first subband's probability value should be high, while the second subband's probability value should be low.

In case the base station communicates with a multitude of user terminals being capable of transmitting and receiving signals only in some of the shared subbands, these subbands probability values should be higher than the other subband's.

In case radio resources are currently assigned to a user terminal moving slowly or not moving at all and having an ongoing demand for radio resources, the probability values regarding these radio resources should be high.

In case the base station knows that channel quality values regarding certain radio resources are currently bad, the probability values regarding these radio resources should be low.

The usage of soft values as opposed to hard values has the advantage of being able to transmit the soft value map earlier than a hard value map could be transmitted. Hard values can only be transmitted after the respective scheduling decisions are made. As the soft values are predictions of the future scheduling behaviour, they can be transmitted before the respective scheduling decisions are made. The earlier a base station receives information regarding the future scheduling behaviour of a neighbouring base station, the better the scheduling behaviour of the receiving base station can be adapted accordingly.

Without indicating the soft values, the measurement effort performed by a base station before scheduling would increase. By detecting signals of the shared resources of the other radio cell, the detection being performed by the base station or a user terminal, the base station can determine which shared radio resources are currently used by the neighbouring base station. Using a received probability map allows a base station to forgo at least some of these measurements, e.g. measurements regarding radio resources having very high or low probability values.

Besides the described soft values of resource allocation, the probability map can contain additional information. An advantageous example is the addition of values regarding predicted transmission powers. From the point of view of a base station receiving a probability map, radio resources having low predicted transmission powers should be preferably scheduled.

Considering the joint radio resource management of base stations NodeB 1 and NodeB 2, it is conceivable that one base station transmits the probability map, while the other base station takes the received soft values into consideration when allocation the shared radio resources. In this case the base station transmitting its map does not have to take into account soft values of the other base station. This procedure corresponds to a prerogative of the base station transmitting its map regarding the choice of subbands. In order to balance this unfairness, the right to transmit the probability map can be switched back and forth from one base station to the other. Switching can take place e.g. because of a switching request of the radio communication system's operation and maintenance system or after negotiations between the base stations. The right to transmit the probability map can for instance depend on the active user density: the higher the number of user terminals presently communicating in a radio cell, the longer lasts the respective base station's right to transmit the probability map. Alternatively or additionally, the shared radio resources can be split into two parts, whereby one of the base stations transmits its map concerning one part, and the other base station transmits its map concerning the other part.

Preferably, both base stations transmit their respective soft values, and therefore both base stations have to take account of the other base station's map when performing scheduling. Through this, a base station's probability map is influenced by an antecedent map of the other base station. This results in a highly efficient coordination of scheduling shared resources.

In the following, as second example of information regarding the future use of shared radio resources exchanged between base stations NodeB 1 and NodeB 2, the map of FIG. 3 will be described. For each subband SB SI, SB S2, SB S3 and SB S4 this map indicates either FS, which stands for fast scheduling, or SS, for which stands for slow scheduling. In case a value of either FS or SS has to be given to each of the shared subbands, the indication of either FS or SS is sufficient. E.g. the map of FIG. 3 could indicate only subband SB S2 and the base station receiving this information would realize that subband SB S2 is a slow scheduling subband, while subbands SB SI, SB S3 and SB S4 are fast scheduling subbands. Further on, it is possible to use void entries, so that for each subband a value of FS, SS or no value can be indicated.

Performing fast scheduling with regard to radio resources means that the assignment of these radio resources changes rather quickly. Performing slow scheduling with regard to radio resources means that the assignment of these radio resources changes rather slowly compared to the time scale used for fast scheduling. In case a base station performs fast scheduling regarding subband SB SI and slow scheduling regarding subband SB S2, the subband SB SI could be assigned by the base station to a first user terminal during a first period of time, not be assigned to any user terminal during a second period of time, and be assigned by the base station to a second user terminal during a third and fourth period of time, while the slow scheduling subband SB S2 could be assigned by the base station to a user terminal during eight consecutive periods of time. Referring to this example, the time scale for fast scheduling is one period of time, while the time scale for slow scheduling is eight periods of time.

Whether fast of slow scheduling is applied for a user terminal can depend e.g. on the user terminal's mobility: the more often an assignment of radio resources is done, the better the adaptation of the assigned radio resources to channel conditions. Typically, channel conditions experienced by a moving user terminal or by a base station communicating with a moving user terminal change more rapidly than those of a slowly moving or not moving user terminal or respectively experienced by a base station communicating with a slowly moving or not moving user terminal. Therefore, user terminals exist necessitating the assignment of radio resources at any one time only for a short time span, i.e. only for one or few consecutive periods of time, so that a quick reallocation is possible. Self-evidently, besides the mobility of user terminals there can be other reasons motivating fast or slow scheduling of radio resources.

Using the map of FIG. 3, base station NodeB 1 informs neighboring base station NodeB 2 about its scheduling strategy regarding the scheduling time scale of the shared subbands. This does not refer to an assignment of specific radio resources to a specific user terminal, but rather to a general strategy of base station NodeB 1 used for the shared subbands. Hence, from the received map base station NodeB 2 knows that base station NodeB 1 applies slow scheduling concerning subband SB S2 and fast scheduling concerning sub-bands SB SI, SB S3 and SB S4. The information contained in the map will be used by base station NodeB 2 when performing scheduling. In the following, different ways of exploiting the base station NodeB 2's knowledge of subband SB S2's slow scheduling is described.

By performing measurements pertaining to the detection of signals on subband SB S2, performed either by base station NodeB 2 or by user terminals reporting their measurement results to base station NodeB 2, base station NodeB 2 determines whether subband SB S2 is currently used by base station NodeB 1. In case subband SB S2 is currently assigned by base station NodeB 1, subband SB S2 is likely to remain assigned by base station NodeB 1 for some time, because slow scheduling is applied by base station NodeB 1 for subband SB S2. Therefore, measurements in order to detect the current assignment of subband SB S2 need not be performed in the radio cell of base station NodeB 2 during this time.

Preferably, besides the indication whether slow or fast scheduling is applied, base stations NodeB 1 informs base station NodeB 2 about its time scale used for slow scheduling. This information can e.g. indicate that for slow scheduling, in each case eight or a multiple of eight consecutive periods of time are assigned by base stations NodeB 1. In this case, base station NodeB 2, having determined that sub-band SB S2 is currently used by base station NodeB 1, can refrain from trying to determine whether subband SB S2 is still assigned by base station NodeB 1 during the following four periods of time, because not knowing since when subband SB S2 is used by base station NodeB 1 on average subband SB S2 will remain occupied by base station NodeB 1 during the next four periods of time.

Further information allowing base station NodeB 2 the efficient exploitation of its knowledge of base station NodeB 1's slow scheduling is the indication of periods of time marking the beginning of assignments of subband SB S2 by base station NodeB 1. For this, base station NodeB 1 can indicate certain periodically recurring periods of time, e.g. period of time number 1, number 9, number 18, etc. Base station NodeB 2 in this case tries at one of the periodically recurring periods of time to determine whether subband SB S2 is used by base station NodeB 1. If this is not the case, base station NodeB 2 can use subband SB S2 until the next one of the periodically recurring periods of time without generating intercell interference. If however, base station NodeB 2 determines that subband SB S2 is currently assigned by base station NodeB 1, no measurements of base station NodeB 2 are necessary in order to determine the usage of subband SB S2 until the next one of the periodically recurring periods of time, as the occupation of subband SB S2 by base station NodeB 2 can be taken for granted.

Alternatively to base station NodeB 2 attempting to find out about the assignment of subband SB S2 with the help of measurements, base station NodeB 1 can notify base station NodeB 2 its current assignment of subband SB S2 without indicating the length of the allocation as the length is known to base station NodeB 2 from the fact that subband SB S2 is used for slow scheduling.

From the above explanations it becomes apparent that base station NodeB 2 uses its knowledge of the slow scheduling behavior of base station NodeB 1 such that transmissions in the radio cell of base station NodeB 1 using the slow scheduling subband are not disturbed by intercell interference. This is achieved by base station NodeB 2 not assigning sub-band SB S2 when base station NodeB 1 uses subband SB S2.

Preferably, neighboring base stations NodeB 1 and NodeB 2 deploy different subbands for slow scheduling. Therefore, as base station NodeB 1 uses subband SB S2 for slow scheduling, base station NodeB 2 can use one or more of subbands SB SI, SB S3 and SB S4 for slow scheduling. Corresponding to base station NodeB 1's map of FIG. 3, base station NodeB 2 can transmit its scheduling time scale map to base station NodeB 1. This results in a base station having to apply fast scheduling with respect to a subband the other base station uses for slow scheduling. Consequentially, radio resources are partitioned according to the scheduling time scale applied: radio resources can be used for slow scheduling by one base station and for fast scheduling by the other base station, or for fast scheduling by both base stations. No subband in this case is used for slow scheduling by both base stations.

In case a base station determines radio resources currently being assigned by slow scheduling of the other base station, the base station refrains from using these radio resources. In case however the base station determines radio resources currently being not assigned by slow scheduling of the other base station, the base station itself may assign these radio resources using fast scheduling. Therefore, long term assignment of radio resources of a first base station forces out short term assignment of a second base station with regard to the same subband. A short term assignment of a subband by one of the base stations used for slow scheduling by the other base station is possible in between two long term assignments.

In order to allow for an efficient, transmission resources of the CI interface saving transmission of the maps of FIGS. 2 and 3, the maps can be exchanged in compressed form using a coding scheme known to the transmitting and the receiving base station.

As the allocation of radio resources in a radio cell is not constant but changes over time, the maps of FIGS. 2 and 3 can be updated and sent repeatedly. The transmission of maps can take place periodically, with differing updating rates, or on demand, i.e. after a certain amount of changes of entries took place. It is not necessary that each time the complete map is transmitted; rather a partial transmission, i.e. the transmission of only segments of a map, is possible.

The method and radio stations are not restricted to coordinating scheduling with regard to shared radio resources. In fact, use with similar radio resources is also advantageous as interference is not restricted to signal transmissions using exactly the same radio resources.

The methods of coordinated radio resource management detailed above refer to neighbouring base stations of one radio communication system. Another aspect of the proposal is intersystem interworking. Two radio communication systems using overlapping or adjacent frequency bands in the same geographical area can make use of the method, too. The information exchanged according to the above detailed embodiment between the two base stations can therefore be exchanged for example between an LTE-NodeB and an UMTS RNC or between an LTE-NodeB and a WiMAX access point.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method of operating a radio communication system, comprising:
    transmitting, from a first radio station to a second radio station, information comprising values relating to a prediction of future assignment strategy, for the first radio station, of first radio resources that are shared between the first radio station and the second radio station, the future assignment strategy regarding a scheduling time scale of shared sub-bands; and
    determining, at the first radio station, an assignment of the first radio resources to a user terminal after transmitting the information comprising values relating to the prediction of the future assignment strategy, for the first radio station, of the first radio resources and thereafter assigning the first radio resources to the user terminal.

2. The method according to claim 1, wherein the second radio station determines an assignment of radio resources to user terminals using the information received from the first radio station and thereafter assigns the radio resources to the user terminals.

3. The method according to claim 1, wherein the first radio station and the second radio station are neighboring radio stations directly communicating with each other.

4. The method according to claim 1, wherein the first radio station is entitled to transmit the information to the second radio station due to a communication between the first radio station and the second radio station regarding the entitlement, or an instruction of a network infrastructure device.

5. The method according to claim 2, wherein the first radio station receives information from the second radio station regarding a future strategy of assignment of the radio resources by the second radio station.

6. The method according to claim 2, wherein the information indicates a probability of assignment of the first radio resources by the first radio station.

7. The method according to claim 6, wherein the information indicates a plurality of probabilities of assignment pertaining to a plurality of radio resources.

8. The method according to claim 7, wherein the second radio station uses the information when determining the assignment of radio resources to the user terminals such that the user terminals are grouped according to the probabilities pertaining to radio resources assigned to user terminals of the respective group.

9. The method according to claim 6, wherein the second radio station uses the information when determining the assignment of radio resources to the user terminals such that the higher the probability of assignment of radio resources by the first radio station, the less likely the assignment of the radio resources by the second radio station.

10. The method according to claim 2, wherein the information relates to a duration of assignment of the first radio resources by the first radio station.

11. The method according to claim 10, wherein the second radio station uses the information such that the second radio station refrains from trying to detect whether the first radio resources are assigned by the first radio station during a time period dependent on the duration of assignment of the first radio resources.

12. The method according to claim 10, wherein the second radio station uses the information such that after detecting that the first radio resources are assigned by the first radio station, the second radio station determines a probability of future assignment of the first radio resources by the first radio station, dependent on the duration of assignment of the first radio resources.

13. The method according to claim 10, wherein the information relates to one out of two selectable durations.

14. The method according to claim 13, wherein the information relates to a longer one out of the two selectable durations, and the second radio station uses the information when determining the assignment of radio resources to the user terminals such that the second radio station refrains from assigning the first radio resources when detecting that the first radio resources are assigned by the first radio station.

15. The method according to claim 13, wherein the first radio resources are radio resources of a first subband, the first radio station using the one out of the two selectable durations when assigning the radio resources of the first subband, the second radio station using the information when determining the assignment of radio resources to the user terminals such that the second radio station uses the other one out of the two selectable durations when assigning the radio resources of the first subband.

16. The method according to claim 15, wherein the first radio station uses the other one out of the two selectable durations when assigning radio resources of a second subband, the second radio station using the one out of the two selectable durations when assigning the radio resources of the second subband.

17. A transmission radio station for a radio communication system including at least one user terminal and a reception radio station, the transmission radio station comprising:
    a transmitter allowing for communication with the at least one user terminal and transmitting, information to the reception radio station, information comprising values relating to a prediction of future assignment strategy, for the transmission radio station, of radio resources that are shared between the transmission radio station and the reception radio station, the future assignment strategy regarding a scheduling time scale of shared sub-bands; and
    a determination unit determining an assignment of the radio resources to the at least one user terminal after the information comprising values relating to the prediction of the future assignment strategy, for the transmission radio station, of the radio resources is transmitted,
    wherein the transmission radio station assigns the radio resources to the at least one user terminal after determining the assignment of the radio resources.

18. A reception radio station for a radio communication system including at least one user terminal and a transmission radio station, the reception radio station comprising:
    a receiver allowing for communication with the at least one user terminal and receiving, from the transmission radio station, information comprising values relating to a prediction of future assignment strategy, for the transmission radio station, of radio resources that are shared between the transmission radio station and the reception radio station, the future assignment strategy regarding a scheduling time scale of shared sub-bands; and
    a determination unit determining an assignment of radio resources to the at least one user terminal after receiving from the transmission radio station the information comprising values relating to the prediction of the future assignment strategy, for the transmission radio station, of the radio resources, wherein the reception radio station thereafter assigns the radio resources to the at least one user terminal.

19. A radio communication system, comprising:
a plurality of user terminals;
a reception radio station; and
a transmission radio station transmitting information comprising values relating to a prediction of future assignment strategy for the transmission radio station of radio resources that are shared between the transmission radio station and the reception radio station, the future assignment strategy regarding a scheduling time scale of the shared sub-bands, determining an assignment of the radio resources to at least one of the user terminals after the information comprising values relating to the prediction of the future assignment strategy, for the transmission radio station, of the radio resources is transmitted, and assigning the radio resources to the at least one user terminal after transmitting the information, the reception radio station receiving, from the transmission radio station, the information comprising values relating to the prediction of the future assignment strategy, for the transmission radio station, of the radio resources that are shared between the transmission radio station and the reception radio station, determining an assignment of radio resources to at least one of the user terminals using the received information comprising values relating to the prediction of the future assignment strategy, for the transmission radio station, of the radio resources, and thereafter assigning the radio resources to the at least one user terminal, wherein the transmission radio station and the reception radio station each communicate with at least one of the user terminals.

* * * * *

UNITED STATES PATENT AND TRADEMARK OFFICE
CERTIFICATE OF CORRECTION

| | | |
|---|---|---|
| PATENT NO. | : 8,611,914 B2 | Page 1 of 1 |
| APPLICATION NO. | : 12/310352 | |
| DATED | : December 17, 2013 | |
| INVENTOR(S) | : Halfmann et al. | |

It is certified that error appears in the above-identified patent and that said Letters Patent is hereby corrected as shown below:

In the Claims:

In Column 14, Line 39, In Claim 17, delete "transmitting, information" and insert -- transmitting, --, therefor.

Signed and Sealed this
Twenty-fifth Day of March, 2014

Michelle K. Lee
*Deputy Director of the United States Patent and Trademark Office*